United States Patent [19]

Persson et al.

[11] Patent Number: 4,555,053

[45] Date of Patent: Nov. 26, 1985

[54] METHOD OF JOINING TOGETHER TWO PIPE ENDS TO FORM A PIPE OF METAL

[75] Inventors: Per I. Persson, Nora; Bengt Persson, Olofström, both of Sweden

[73] Assignees: Nitro Nobel AB, Gyttorp; AB Volvo, Gothenburg, both of Sweden

[21] Appl. No.: 618,516

[22] Filed: Jun. 8, 1984

[30] Foreign Application Priority Data

Jun. 9, 1983 [SE] Sweden ............................. 8303263

[51] Int. Cl.$^4$ .............................................. B23K 20/08
[52] U.S. Cl. ................................. 228/107; 228/119; 228/2.5; 29/402.06; 403/270
[58] Field of Search ............... 228/2.5, 107, 119, 153, 228/154, 173.2; 29/402.01, 402.05, 402.06, 402.09; 403/270, 271, 272

[56] References Cited

U.S. PATENT DOCUMENTS

| | | | |
|---|---|---|---|
| 3,096,105 | 7/1963 | Risley | 403/270 X |
| 4,089,455 | 5/1978 | Fellers | 228/119 X |
| 4,228,941 | 10/1980 | Persson | 228/107 |
| 4,448,343 | 5/1984 | Kochka et al. | 228/119 X |

FOREIGN PATENT DOCUMENTS

| | | | |
|---|---|---|---|
| 1596 | 1/1982 | Japan | 228/119 |
| 766741 | 1/1957 | United Kingdom | 228/107 |
| 2106817 | 4/1983 | United Kingdom | 228/2.5 |

Primary Examiner—Kenneth J. Ramsey
Assistant Examiner—M. Jordan
Attorney, Agent, or Firm—Dennison, Meserole, Pollack & Scheiner

[57] ABSTRACT

When joining together pipes the pipe ends are usually placed opposite each other and then welded together. This cannot be done with heavy pipes. A gap exists between the ends (3 and 4) to be joined. The invention provides a joint by producing a splicing tube (5) the length of the gap and joining this by means of explosive welding. The invention is also applicable for mending a defect (2) in a pipe (1) by the removal of a sufficiently large section of the pipe (1) to allow the splicing tube (5) to fit into the space obtained, the part removed containing the defect (2).

10 Claims, 8 Drawing Figures

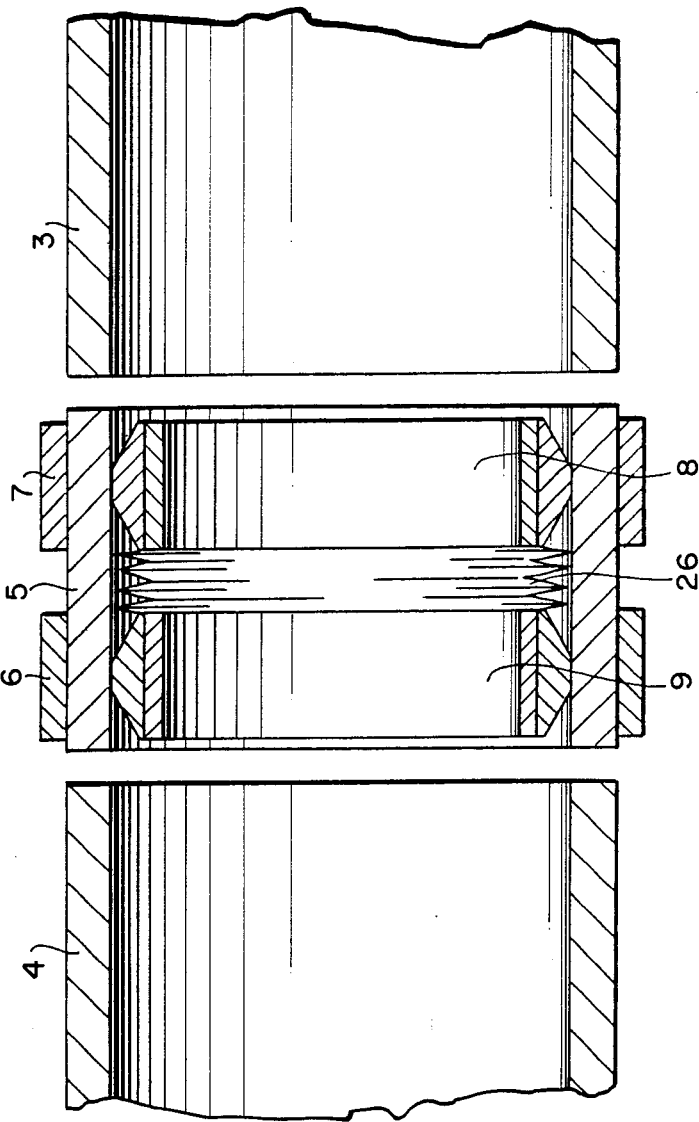

METHOD OF JOINING TOGETHER TWO PIPE ENDS TO FORM A PIPE OF METAL

SUMMARY OF THE INVENTION

The present invention relates to a method of joining together two pipe ends to form a pipe, preferably of metal. The invention relates particularly to pipes of such large diameter as those used for transporting of oil and gas. Other pipes for which the invention is suitable are pipes for district heating plants. These pipes are generally so heavy that it is impractical to move two ends together into contact with each other to enable joining. Pipes of the type mentioned are generally known as pipe-lines.

The object of the present invention is to achieve a joint between two pipes where the opposing pipe ends are spaced from each other and where movement of the pipes is to be avoided. The joint is provided by preparing a splicing tube, having a length substantially corresponding to the distance between the two pipe ends to be joined. The splicing tube has the same dimension as the two pipes to be joined. Two joint areas are formed and joining is performed at these points by means of explosive welding with the aid of an outer peripheral body at each joining point and an inner peripheral body also arranged at each of the two joint points, the latter peripheral bodies being caused, each by its own explosive charge, to form an explosive weld at each joint area. The outer peripheral bodies may of course be replaced by a tool used only while explosive welding is being performed. The peripheral bodies may also be such that after explosive welding they are destroyed.

The explosive welding at each of the joint areas is initiated simultaneously.

One requirement is that the splicing tube is such that two explosive welds can be performed, one at each end of the tube. If the distance between the two pipe ends to be joined is too short to allow the use of a splicing tube for explosive welding, one or both ends of the two pipes to be joined should be cut to give sufficient space between the two pipe ends.

The invention is also particularly suitable for repairing pipes having a defect somewhere between the ends. A section of the pipe containing the defect is cut away, the removal of said defect section resulting in two pipe ends with a gap between them where a splicing tube as described above can be applied with outer and inner peripheral bodies and explosive charges.

Outer and inner peripheral bodies may either be placed on each pipe end or on a splicing tube which is to constitute a connection element between the pipe ends. All peripheral bodies must be arranged inside the end edges of the pipe ends or splicing tube, respectively. This is to enable the splicing tube to be inserted between the two pipe ends to be joined.

According to the invention displacement means are also arranged to displace at least the inner peripheral bodies to a position covering the two joints formed. For this purpose one or more pull-strips, cords or wires may be used. Pre-stressed springs are also feasible, spring-force being exerted upon displacement. A pressure medium such as gas or liquid may also be used for the displacement.

At least the inner peripheral bodies are provided with blocking means cooperating with a gap arising at the two joint areas.

According to the invention a prefabricated unit is preferably used consisting of a splicing tube provided at the ends with both inner and outer peripheral bodies, the inner peripheral bodies being provided with explosive charges and displacement means which can be released are arranged between the inner peripheral bodies.

The explosive charges are preferably initiated electrically, voltage being transmitted inductively through a pipe wall from a voltage source to an initiator at the explosive charge inside the splicing tube.

BRIEF DESCRIPTION OF THE DRAWING

The present invention will be described in more detail with reference to the accompanying eight drawings in which FIG. 8 shows a unit consisting of splicing tube with inner and outer peripheral bodies and displacement means.

DESCRIPTION OF THE PREFERRED EMBODIMENTS

Figure 1:
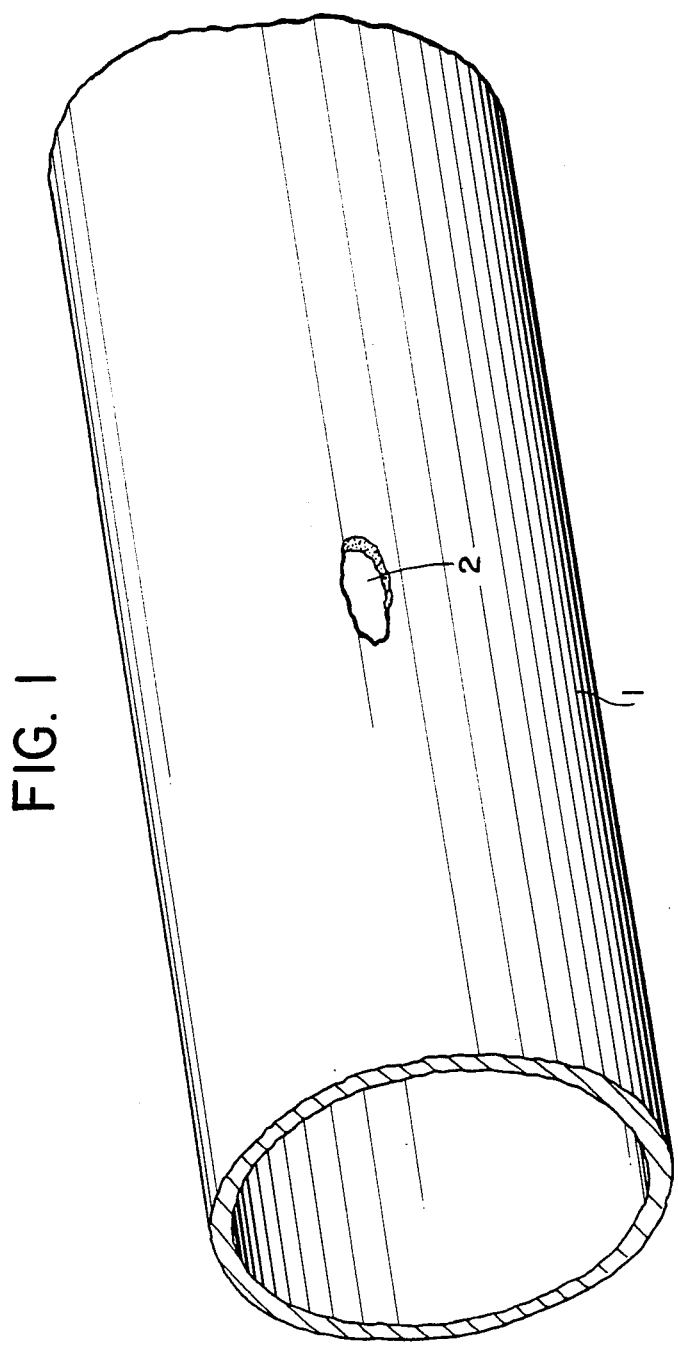
FIG. 1 shows a pipe with a defect.
Figure 2:
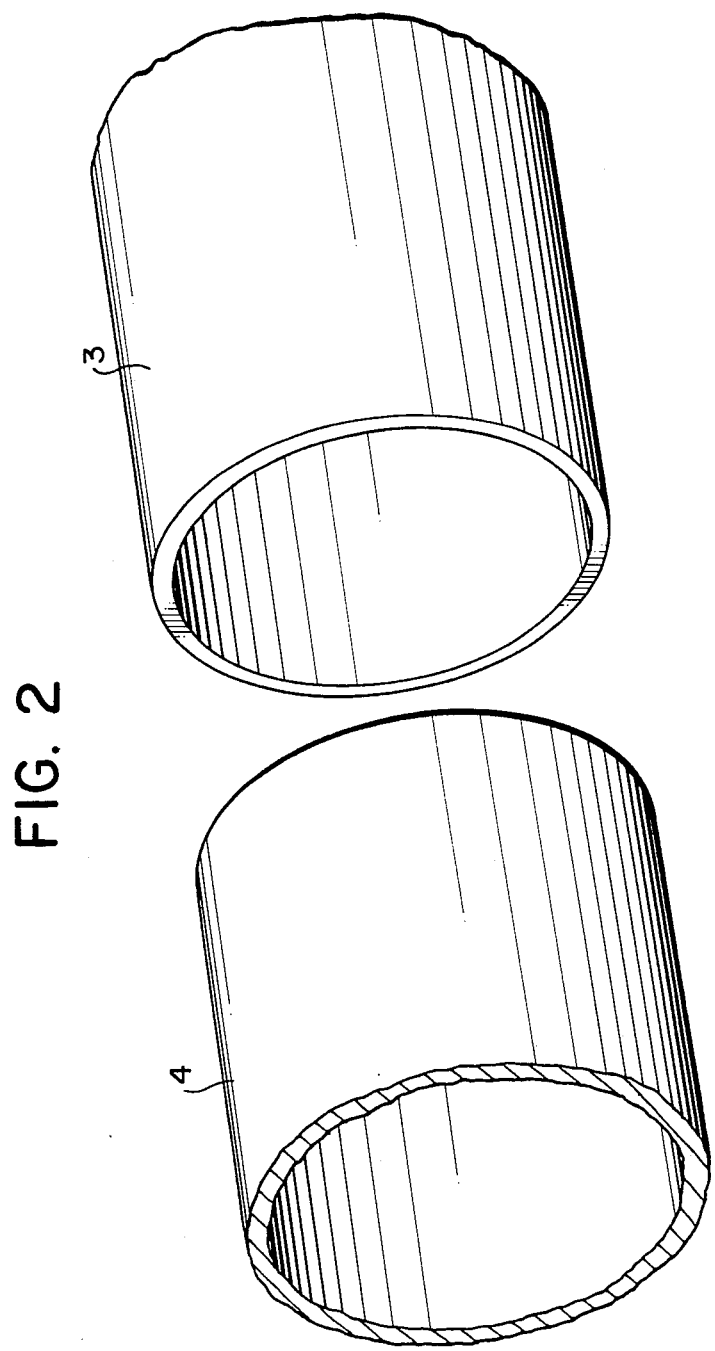
FIG. 2 shows the defective part cut away, thus producing two pipe ends.
Figure 3:
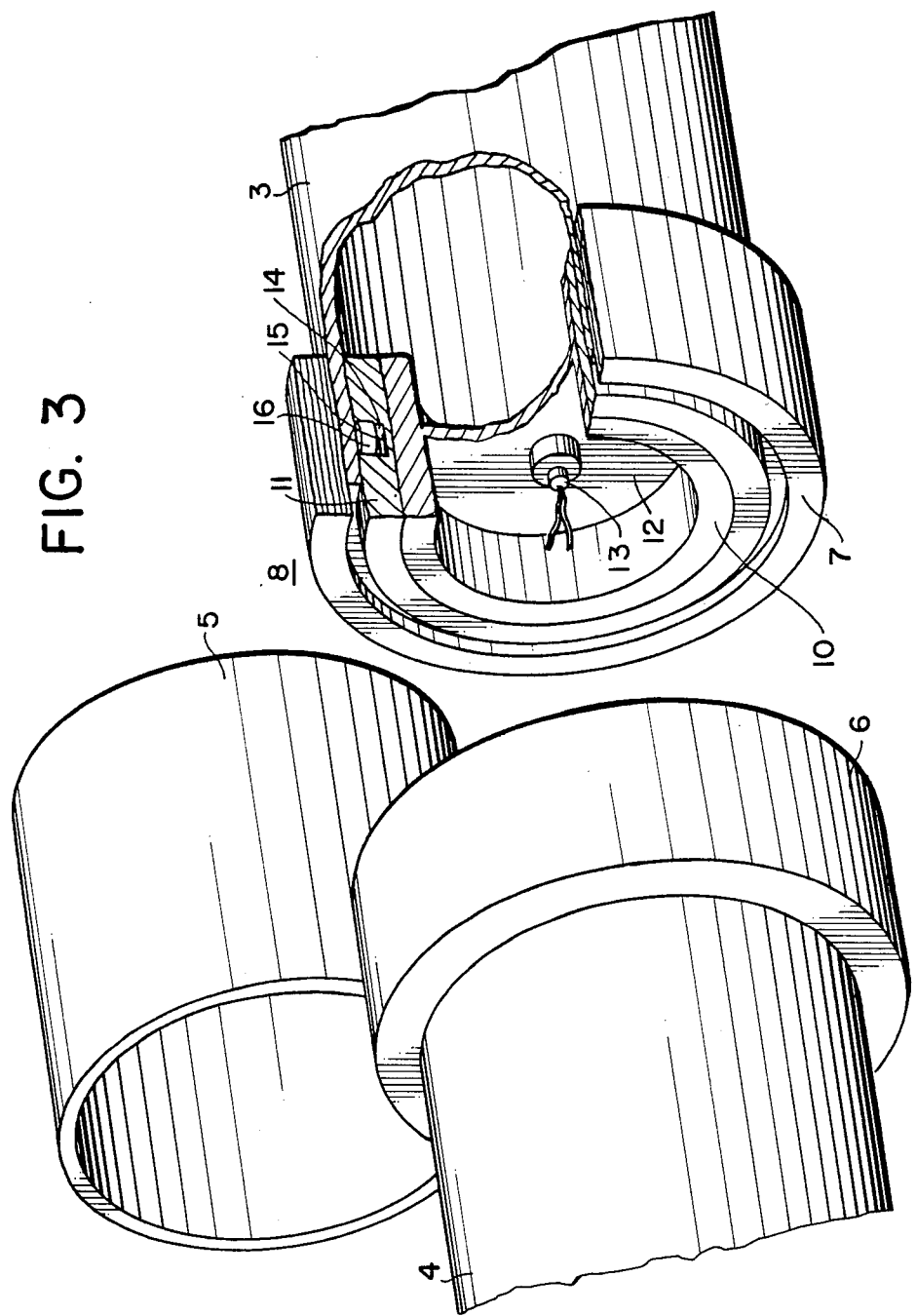
FIG. 3 shows the pipe ends each provided with an inner and an outer peripheral body and with an explosive charge for each inner peripheral body and a splicing tube for insertion between the two pipe ends.

FIG. 1 shows a large-diameter pipe 1 with a hole or defect 2. The pipe consists of metal and is intended for use in pipe-lines for transporting oil and gas. It may of course equally well be used for district heating. Characteristic of the pipe is that it is part of a pipe-line and cannot therefore be moved. Even on its own it is too heavy to be moved manually. The pipe requires mending and this is done by cutting away a section including the hole 2, thereby forming two pipe ends 3 and 4 located opposite each other, as can be seen in FIG. 2. The situation may also be such that instead of repairing the pipe 1 in FIG. 1, the object is to join two pipe ends 3 and 4 in a pipe which cannot be moved. The two pipe ends 3 and 4 are jointed with the aid of a splicing tube 5 having a length corresponding to the distance between the pipe ends 3 and 4. The gaps which may occur at the joints may be up to 20 mm. Before the splicing tube 5 is positioned an inner peripheral body 11 of metal must be inserted in each pipe end. The peripheral body 11 is provided around its circumference with a number of holes 14 containing a spring 15 and a cylindrical body or plug 16.

Figure 4:
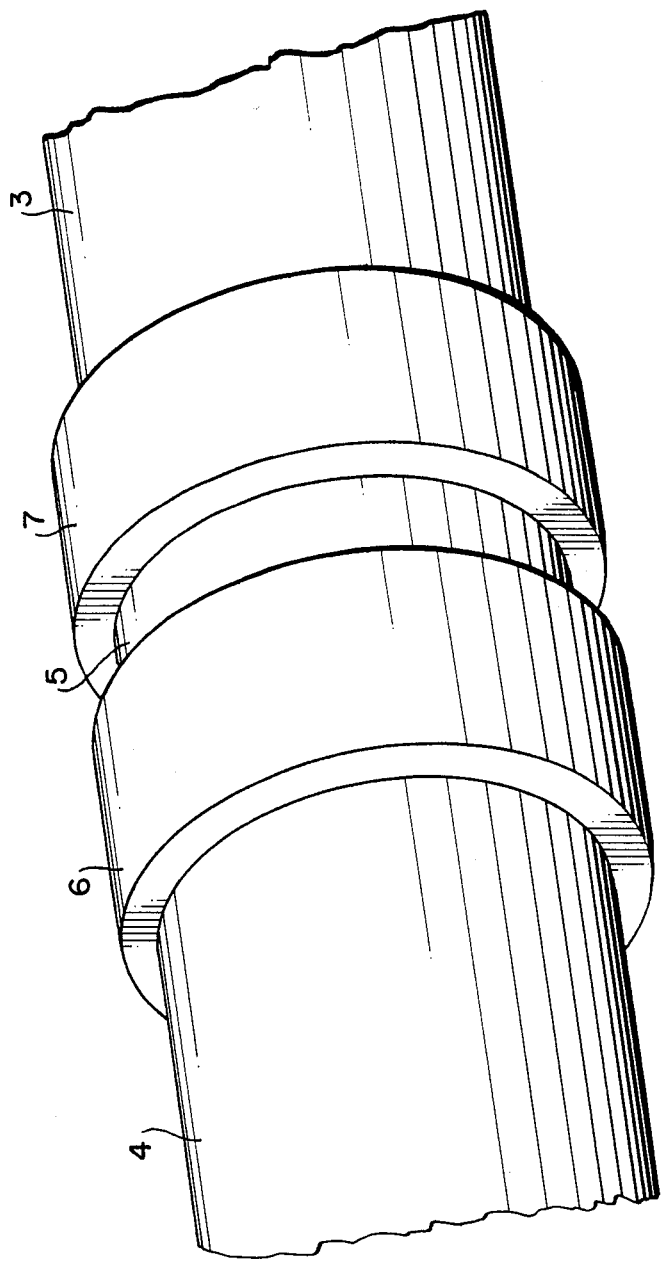
FIG. 4 shows the splicing tube placed between the two pipe ends and the inner and outer peripheral bodies placed over the joint areas formed.
Figure 5:
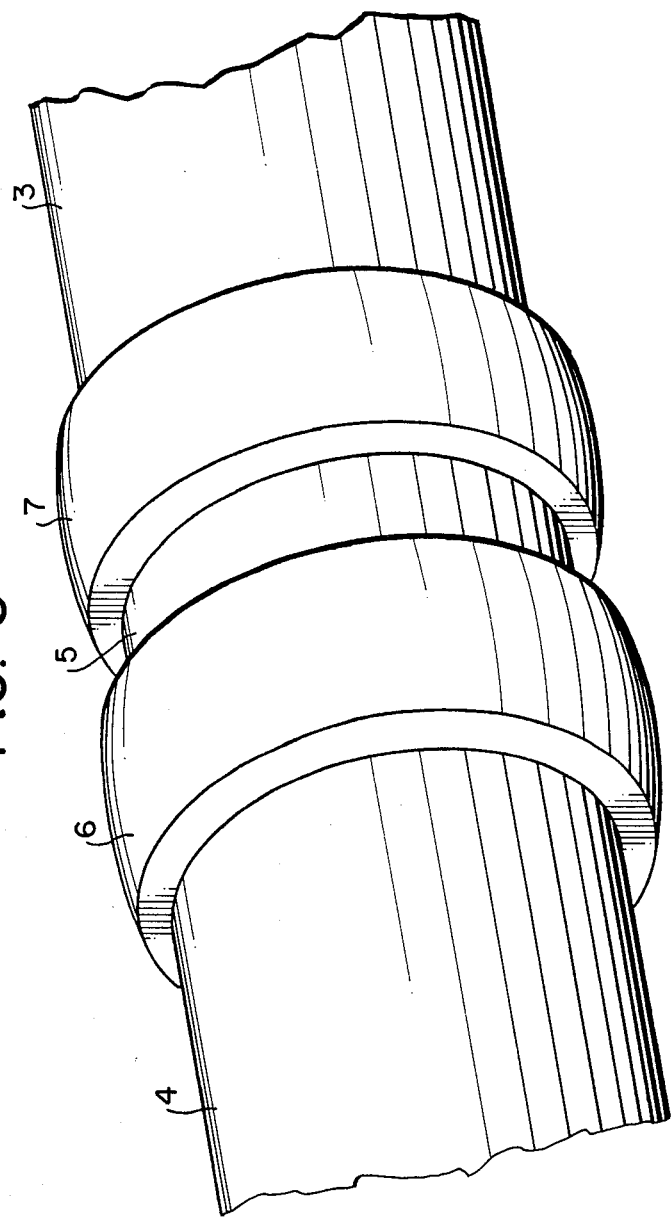
FIG. 5 shows the two pipe ends after joining by means of explosive welding.

Inside the peripheral body 11 is a cylindrical body 10 constituting an explosive charge which may consist of dynamite, dynamex, trinitro toluene or other suitable explosive. At the centre of the explosive charge 10 is a disc 12 constituting an initiator which may consist of pentyl or some other equivalent explosive. At the centre of the disc 12 is an electric detonator 13. An outer peripheral body 7 of metal is applied on the outer surface of the pipe end 3 in order to provide support. The pipe end 4 is also provided with an outer peripheral body 6 and an inner peripheral body corresponding to the peripheral body 11, also provided with explosive charge, initiator and detonator. When both pipe ends 3 and 4 have been equipped as described above, the splicing tube 5 is positioned between the two pipe ends 3 and 4. After this, the two inner peripheral bodies are moved, to where one of the bodies 11 is visible against the splicing tube 5 so that the cylindrical bodies or plugs snap into the gaps formed between the pipe ends 3 and 4 and the splicing tube 5. Thereafter, the outer peripheral bodies 6 and 7 are also moved to cover the gap between the pipe ends 3 and 4 and the splicing tube 5. If the detonators are initiated in this position, a double explosion will occur, the two inner peripheral bodies producing explosion welds while the outer peripheral bodies 6 and 7 are deformed and produce mechanical joints. FIG. 4 shows the outer peripheral bodies located over the gaps before explosive welding, and FIG. 5 shows the outer peripheral bodies 6 and 7 after explosive welding.

Figure 6:
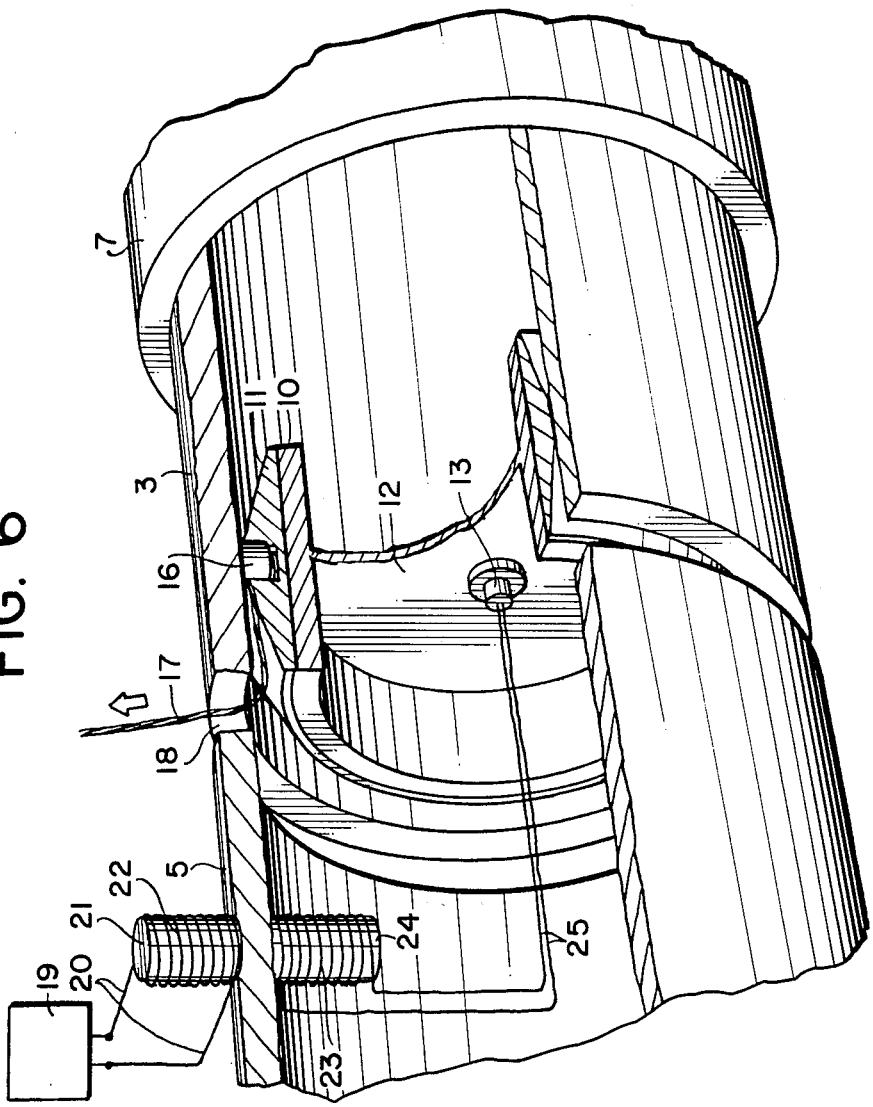
FIG. 6 shows a detailed view of a pipe end and a splicing tube before the inner and the outer peripheral bodies have been moved over a joint area.
Figure 7:
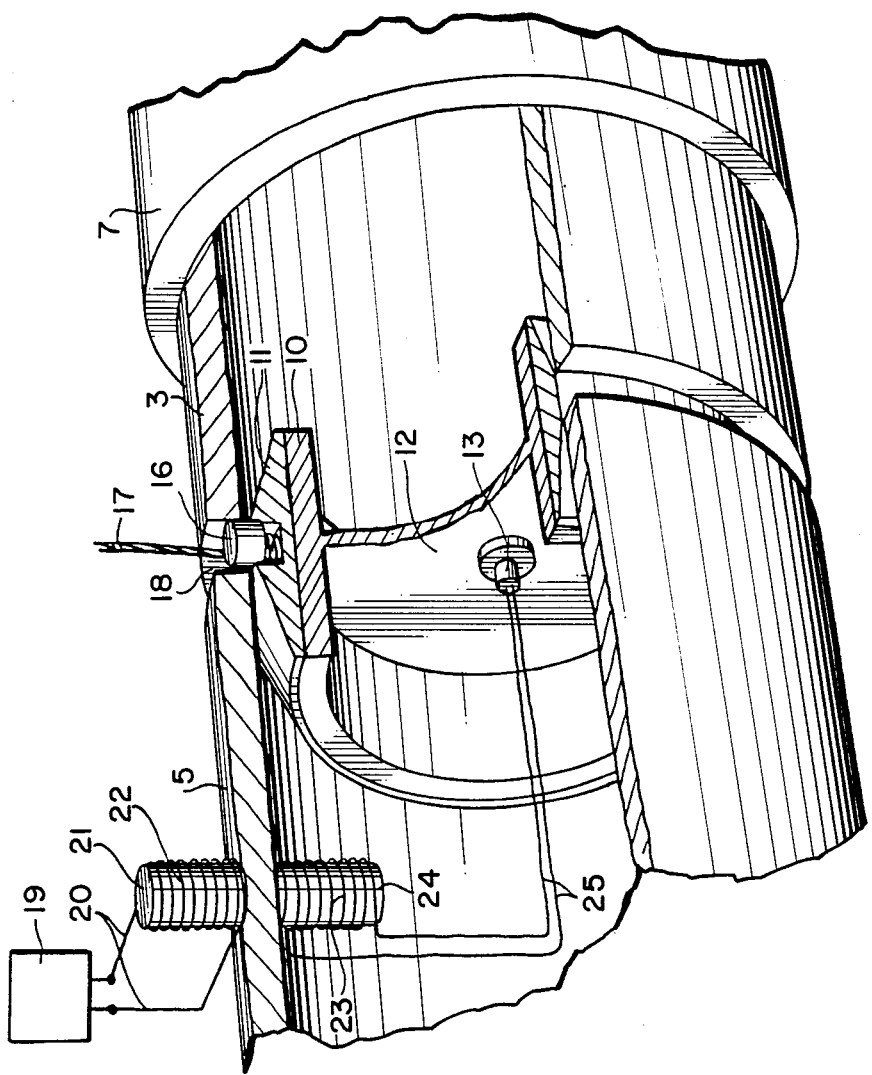
FIG. 7 shows the inner peripheral body in FIG. 6 in position at a joint area.

FIGS. 6 and 7 show in greater detail how the inner peripheral body 11 is moved to the joint area after the splicing tube 5 has been positioned. A number of pull-strips or cords 17 attached to the inner peripheral body 11 and passing out through the gap 18 between the pipe end 3 and splicing tube 5 are used for the displacement. If the strip 17 is pulled the peripheral body 11 will be displaced to the joint and the cylindrical body 16 will then snap into the gap 18. The peripheral body 11 is thus located symmetrically in relation to the pipe end 3 and the end of the splicing tube 5. This symmetrical position can be seen clearly in FIG. 7.

The displacement of the inner peripheral body can also be performed in other ways, such as by releasing a spring located inside the pipe end 3. Another possibility is to use a pressure medium, also located inside the pipe end 3. The pressure medium may be created by releasing a weak detonation. The peripheral body at the left side of the splicing tube is brought into a position corresponding to that for the righthand inner peripheral body in the same manner as the latter. The two explosive charges, one of which is designated 10, are released by electric triggering of the detonator, one of which is designated 13. For this purpose a voltage unit or pulse generator 19 is used, which supplies voltage or pulses via conductors 20 to a coil 22 with an iron core 21. Voltage generated in the coil 22 is transmitted inductively through the wall of the splicing tube 5 to a coil 23 with iron core 24, located inside the splicing tube. The coil 23 is connected to the electric detonator 13 via conductors 25. The coil 23 is also connected to the second detonator. The two explosive charges are initiated simultaneously.

A description has been given above of how the inner and outer peripheral bodies are arranged around the pipe ends 3 and 4. However, it must be evident that a unit can be prepared consisting of splicing tube 5 containing two units 8 and 9 each consisting of an inner peripheral body with explosive. Between the units 8 and 9 is a means 26 for displacing the units 8 and 9 when triggered. The prefabricated unit is also provided with the necessary outer peripheral bodies 6 and 7. A prefabricated unit facilitates pipe-joining since the unit need only be positioned and displacement of the units 8 and 9 triggered, followed by displacement of the peripheral bodies 6 and 7, whereupon an explosive weld is effected. The latter method is probably the quickest way of achieving a joint between two pipe ends. These ends may either being the ends of two pipes to be joined which cannot be moved, or they may have been formed after removal of a defective part of a pipe.

A condition of the present invention is that the splicing tube 5 must be long enough to permit double explosive welding. Should the distance between the two pipe ends 3 and 4 be shorter that the length required for the splicing tube, one or both the pipe ends must be cut to provide a distance corresponding to the length necessary for the splicing tube 5.

I claim:

1. Method of joining together two pipe ends to form a pipe, said pipe ends being opposite each other and fixedly located at a distance from each other making conventional welding impossible, characterised in that a splicing tubr or intermediate section (5) is prepared, having a length substantially corresponding to the distance between said two pipe ends (3 and 4), the length of the splicing tube (5) can be joined to an opposing pipe end (3 or 4) by means of explosive welding, placing said splicing tube (5) between said pipe ends (3 and 4) and locating two inner peripheral bodies to bridge the gaps between the ends of the splicing tube (5) and the opposite pipe ends (3 and 4), providing outer peripheral support means (6 and 7) functioning as support and igniting an inner explosive charge (10) at each end of the splicing tube (5) to to produce an explosive weld so that each inner peripheral body (11) forms a bond between each pipe end and each splicing tube end.

2. Method according to claim 1, characterised in that the explosive charges (10) are initiated simultaneously.

3. Method according to claim 1 characterised in that the two pipe ends are obtained by removing part of a pipe between its ends.

4. Method according to claim 1, characterised in that said outer peripheral bodies (6 and 7) and said inner peripheral bodies (11) with associated internal explosive charges (10) are first arranged at one side of the joint between said two pipe ends (3 and 4) and the ends of said splicing tube (5) and are thereafter displaced to cover the two joint areas both internally and externally.

5. Method according to claim 4, characterised in that at least one displacement is performed mechanically, by means of one or more strips, wires (17) or the like.

6. Method according to claim 4, characterised in that at least one displacement is performed by releasing one or more pre-stressed springs.

7. Method according to claim 4, characterised in that at least one displacement is performed directly or indirectly by means of a pressure medium which may be in gaseous or liquid form.

8. Method according to claim 4, characterised in that at least one displacement can only be performed a limited distance due to the presence of blocking means (16) such as detent means cooperating with a space (18) formed by two opposing pipe edges.

9. Method according to claim 1 in which each explosive charge is ignited electrically by means of an initiator (13) such as a detonator, characterised in that electric voltage is transmitted inductively to the initiator.

10. Unit for performing the method according to claim 1, characterised in that it consists of a splicing tube (5) threaded at each end onto an out peripheral body (6 and 7) so that said outer peripheral bodies are located inside the end edges and having an inner peripheral body (11) inserted at each end, so oriented as to be located inside the end edges, said peripheral bodies (11) being provided with an explosive charge (10), that the splicing tube (5) is provided with displacing means (17) for at least the inner peripheral bodies.

* * * * *